(12) United States Patent
Downing (10) Patent No.: US 6,471,066 B1
(45) Date of Patent: Oct. 29, 2002

(54) TRASH BAG PATCH

(76) Inventor: Eric E Downing, 30921 Orwell Rd., Ontario, WI (US) 54651

( * ) Notice: Subject to any disclaimer, the term of this patent is extended or adjusted under 35 U.S.C. 154(b) by 0 days.

(21) Appl. No.: 09/827,964

(22) Filed: Apr. 6, 2001

(51) Int. Cl.[7] ............................................. B65D 85/672
(52) U.S. Cl. ...................... 206/582; 206/390; 206/394; 383/119
(58) Field of Search .......................... 156/235; 206/390, 206/391, 394, 409, 582; 283/81; 383/10, 66, 119; 428/42.2, 42.3, 43; 493/187, 210, 213–215, 220

(56) References Cited

U.S. PATENT DOCUMENTS

| | | | | |
|---|---|---|---|---|
| 3,413,899 A | * | 12/1968 | Timms | 493/213 |
| 3,752,304 A | * | 8/1973 | Alef | 428/43 |
| 3,799,829 A | * | 3/1974 | Heatwole | 156/235 |
| 3,914,483 A | * | 10/1975 | Stipek, Jr. | 428/42.3 |
| 4,420,520 A | * | 12/1983 | Jones et al. | 428/42.3 |
| 4,735,342 A | * | 4/1988 | Goldstein | 206/394 |
| 5,486,021 A | * | 1/1996 | Laurash | 283/81 |
| 5,611,626 A | * | 3/1997 | Warr | 383/10 |
| 5,631,055 A | * | 5/1997 | Vines et al. | 428/42.3 |
| 5,897,210 A | * | 4/1999 | Giblin et al. | 383/66 |
| 6,254,909 B1 | * | 7/2001 | Williams et al. | 383/119 |

* cited by examiner

*Primary Examiner*—Jim Foster
(74) *Attorney, Agent, or Firm*—Michael I. Kroll (57) ABSTRACT

The present invention 10 discloses a self-adhering patch 24 for repairing a hole in a garbage bag 12. A first surface patch section 24 is pulled out from a dispenser 26 and separated from the adjacent patch section 28 by tearing across the perforated line 30. A dispenser 26 is shown having a roll of surface patches 24 and a roll of elongated reinforcement strips 42 thereon. A central axle 44 extends longitudinally through the dispenser 26 to allow the two central cylinders 46,48 to rotate independently therein.

4 Claims, 10 Drawing Sheets

TRASH BAG PATCH

BACKGROUND OF THE INVENTION

1. Field of the Invention

The present invention relates generally to plastic trash bags, and more specifically, to a patch system for repairing rips and tears in plastic trash bags that could be caused by the contents, animals, or factory imperfections among other things. A filled trash bag could be difficult to lift once the integrity of the bag is compromised thereby making it difficult to place it inside another trash bag without making a mess. The present invention provides self-adhering patches manufactured of a similar material as that of a conventional trash bag with surface patches that are preferably substantially rectangular in shape for placement over the tear and elongated reinforcement strips for redistributing the internal tension exerted against the patch from the contents inside of the bag.

2. Description of the Prior Art

There are numerous types of patch systems, while these patch systems may be suitable for the purposes for which they were designed, they would not be as suitable for the purposes of the present invention as hereinafter described.

SUMMARY OF THE PRESENT INVENTION

The present invention discloses a self-adhering patch for repairing a hole in a garbage bag. A first surface patch section is pulled out from a dispenser and separated from the adjacent patch section by tearing across the perforated line. A dispenser is shown having a roll of surface patches and a roll of elongated reinforcement strips thereon. A central axle extends longitudinally through the dispenser to allow the two central cylinders to rotate independently therein.

A primary object of the present invention is to provide a patch system for repairing plastic bags that will allow the user to quickly and easily place a self-adhering surface patch over a tear in a plastic trash bag to maintain the contents therein during lifting and transporting.

An additional object of the present invention is to provide a patch system for repairing trash bags wherein the surface patches are of a substantially rectangular shape and are on a continuous sheet wrapped around a rotating cylinder for easy distribution with perforations located between each patch section for easily separating each patch from the roll.

A further object of the present invention is to provide a patch system for repairing plastic bags wherein each patch section comprises a sheet of plastic of a similar gauge as conventional trash bags and has a peel and stick adhesive backing.

A yet further object of the present invention is to provide a patch system for repairing plastic bags that could also include elongated plastic strips with a peel and stick adhesive backing for reinforcing the torn portion of the plastic bag by redistributing the pressure exerted against the patch by pulling the opposing sides of the tear towards one another in a manner similar to that of a butterfly type bandage.

Another object of the present invention is to provide a patch system for repairing plastic bags wherein the reinforcement strips could be of predetermined lengths and separated by perforations or there could be a cutting mechanism provided in the dispenser for cutting the reinforcement strips to the necessary lengths as needed.

Still another object of the present invention is to provide a patch system for plastic bags whereby one or more surface patches may be removed from the roll but not separated from one another when a larger patch is desired than the predetermined size that the patches are cut to. Reinforcement strips could be placed over the patches and the bag to prevent the perforations between patch sections from separating.

Yet another object of the present invention is to provide a patch system for plastic bags that is simple and easy to use.

Yet another object of the present invention is to provide a patch system for plastic bags that is economical in cost to manufacture.

Further objects of the present invention will appear as the description proceeds.

To the accomplishments of the above and related objects, this invention may be embodied in the form illustrated in the accompanying drawings, attention being called to the fact, however, that the drawings are illustrative only, and that changes may be made in the specific construction illustrated and described in the appended claims.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views.

LIST OF REFERENCE NUMERALS

With regard to reference numerals used, the following numbering is used throughout the drawings.

10 present invention
12 trash bag
14 curb
16 garbage
18 hole
20 dog
22 user
24 first surface patch section
26 dispenser
28 second surface patch section
30 perforated line
32 plastic
34 peel and stick backing 36 adhesive
38 roll
40 cylinder
42 reinforcement strip
44 axle
46 central cylinder
48 central cylinder
50 spacers

DESCRIPTION OF THE PREFERRED EMBODIMENT(S)

The following discussion describes in detail one embodiment of the invention and several variations of that embodiment. This discussion should not be construed, however, as limiting the invention to those particular embodiments, practitioners skilled in the art will recognize numerous other embodiments as well. For definition of the complete scope of the invention, the reader is directed to appended claims.

Figure 1:
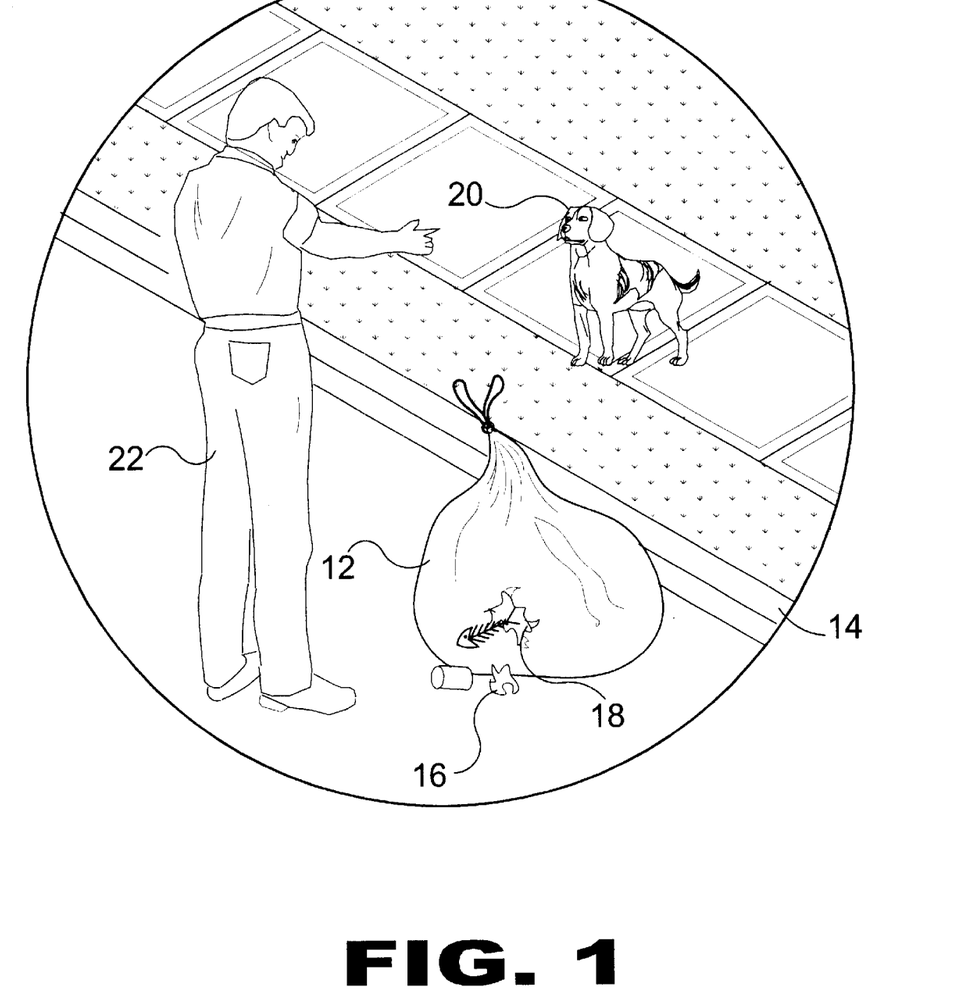
FIG. 1 is a perspective view of a torn trash bag at curbside.

Turning to FIG. 1, shown therein is a perspective view showing a trash bag 12 at the curb 14 that has garbage 16 coming out of a hole 18 or torn section of the bag caused by a dog 20 with a user 22 standing by.

Figure 2:
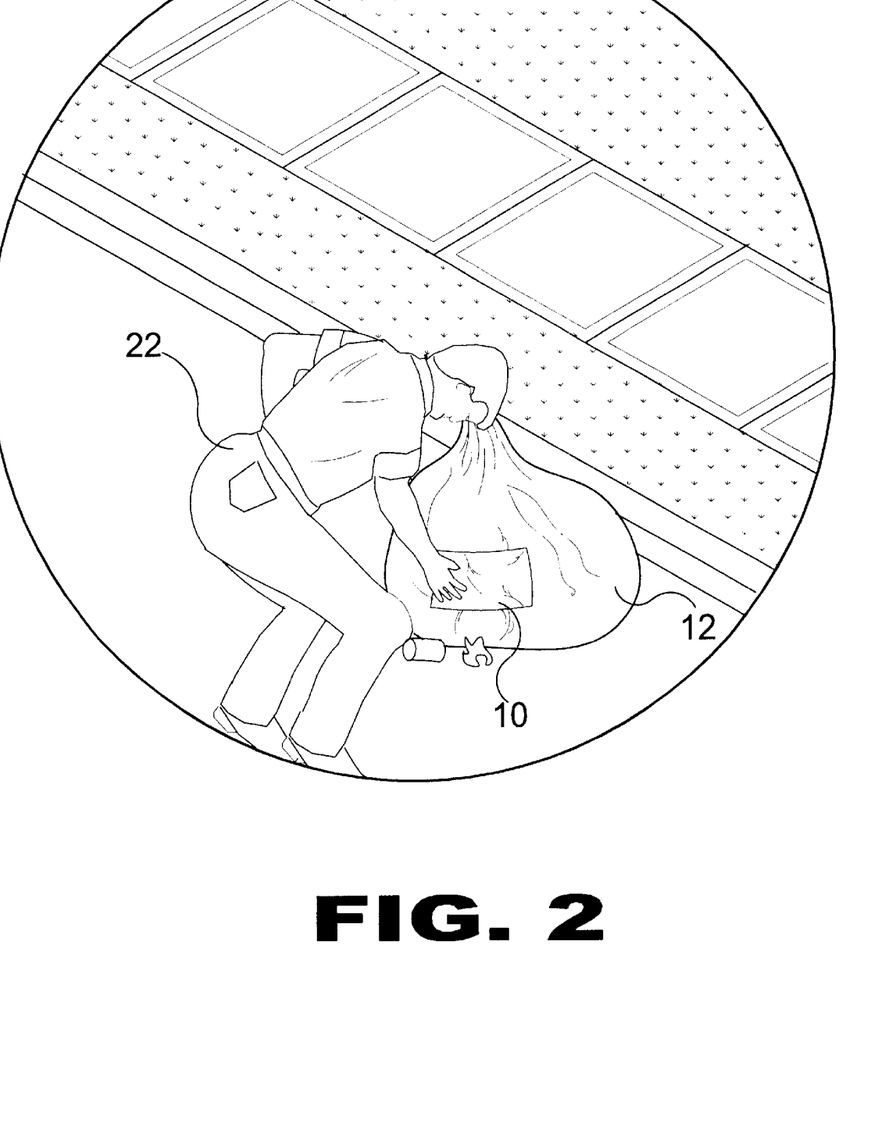
FIG. 2 is a perspective view of present invention in use.

Turning to FIG. 2, shown therein is a perspective view of the present invention 10 in use showing a self-adhering patch 10 on the hole in the garbage bag 12 shown in FIG. 1. The user 22 is shown placing patch 10 onto the bag 12.

Figure 3:
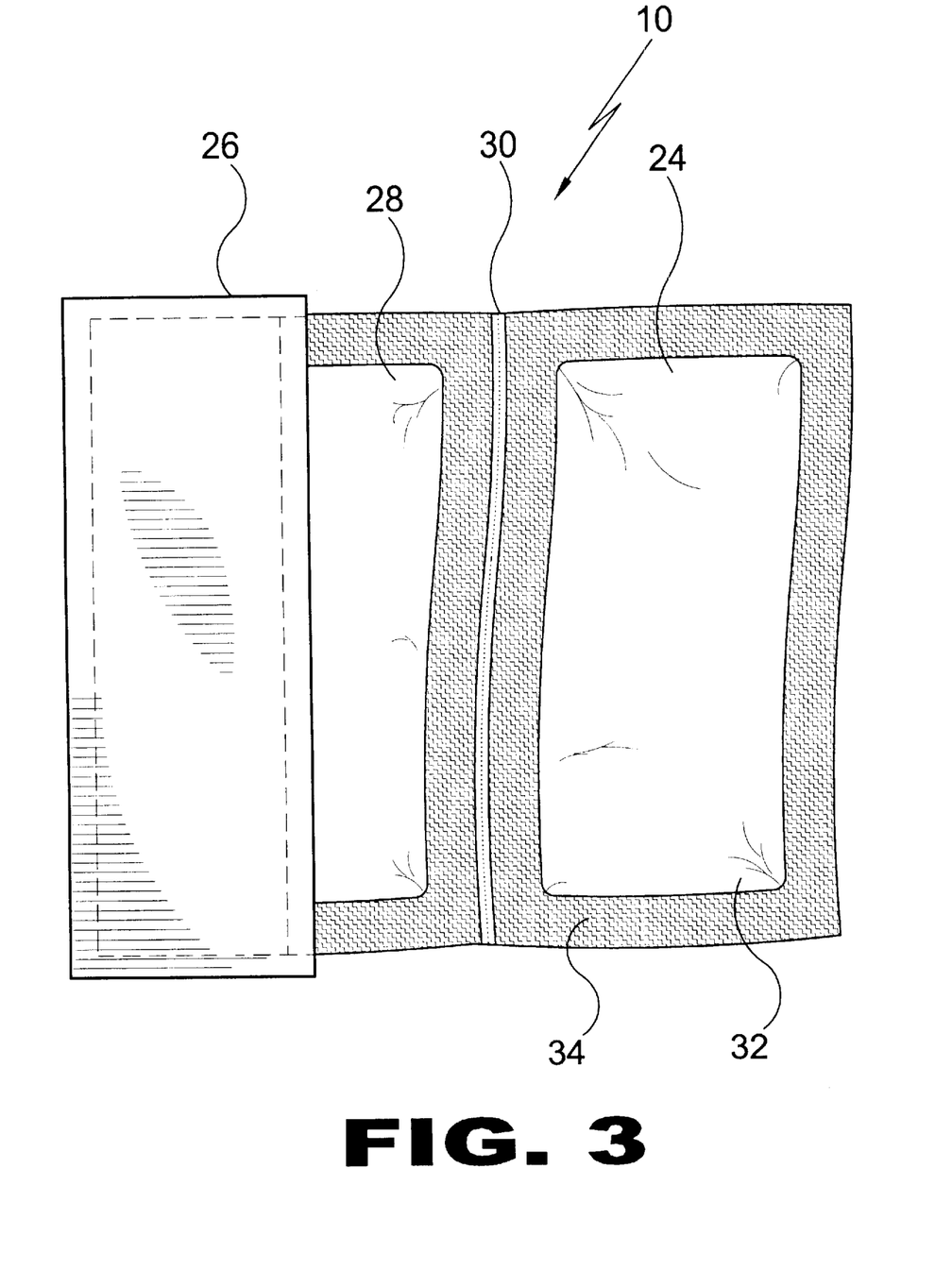
FIG. 3 is a top view of the present invention in a dispenser.

Turning to FIG. 3, shown therein is a front view of the present invention 10 showing the first surface patch section 24 pulled out from the dispenser box 26 and ready to be separated from the succeeding or following adjacent patch 28 section by tearing across the perforated line 30 disposed on opposite edges. Patch 10 is made of plastic material 32 having an adhesive peel and stick backing 34.

Figure 4:
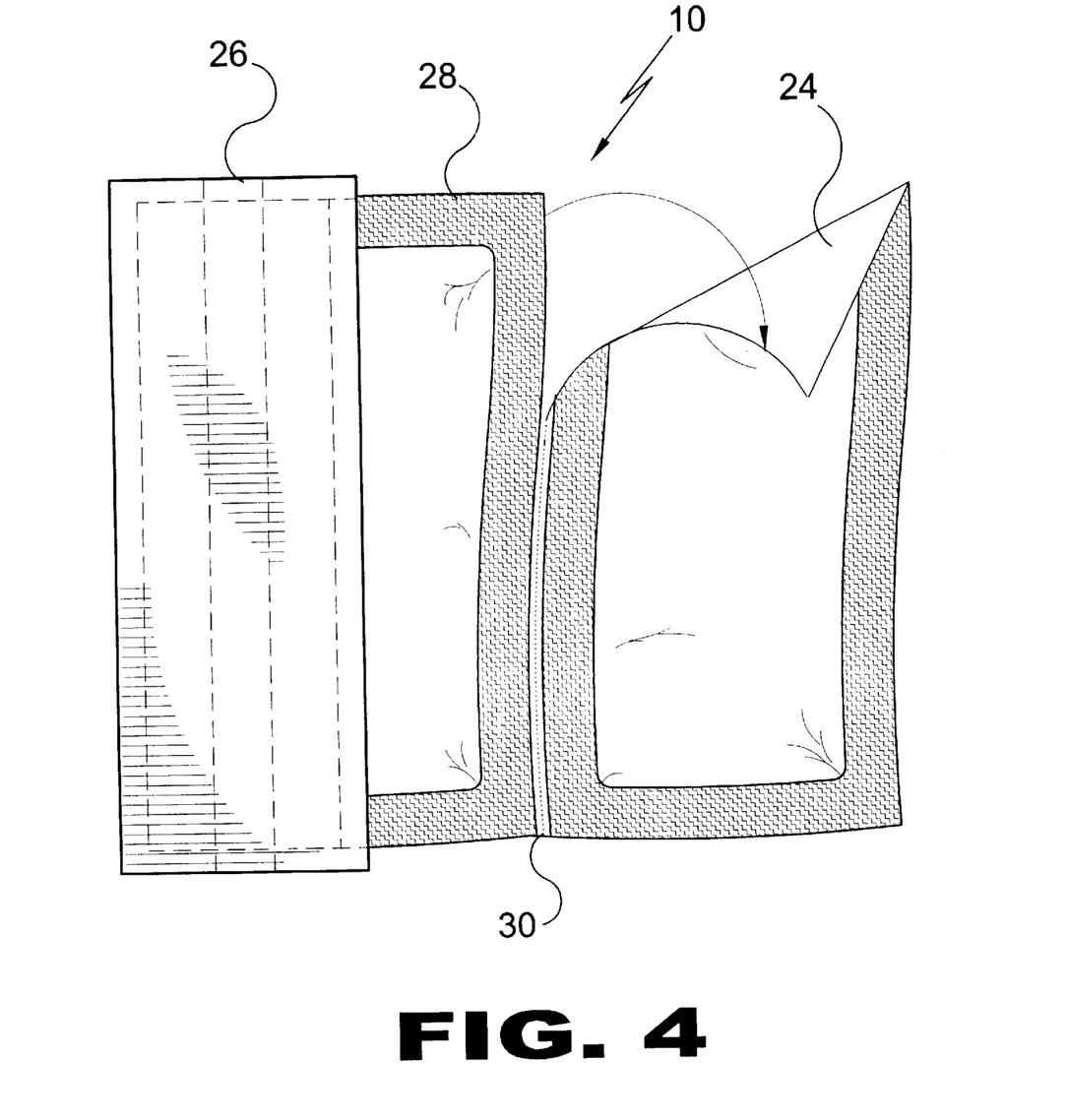
FIG. 4 is a top view of the present invention in a dispenser with one patch being separated from the roll.

Turning to FIG. 4, shown therein is a top view of the present invention 10 showing the first patch section 24 being torn off of the roll. Other elements previously disclosed are also shown.

Figure 5:
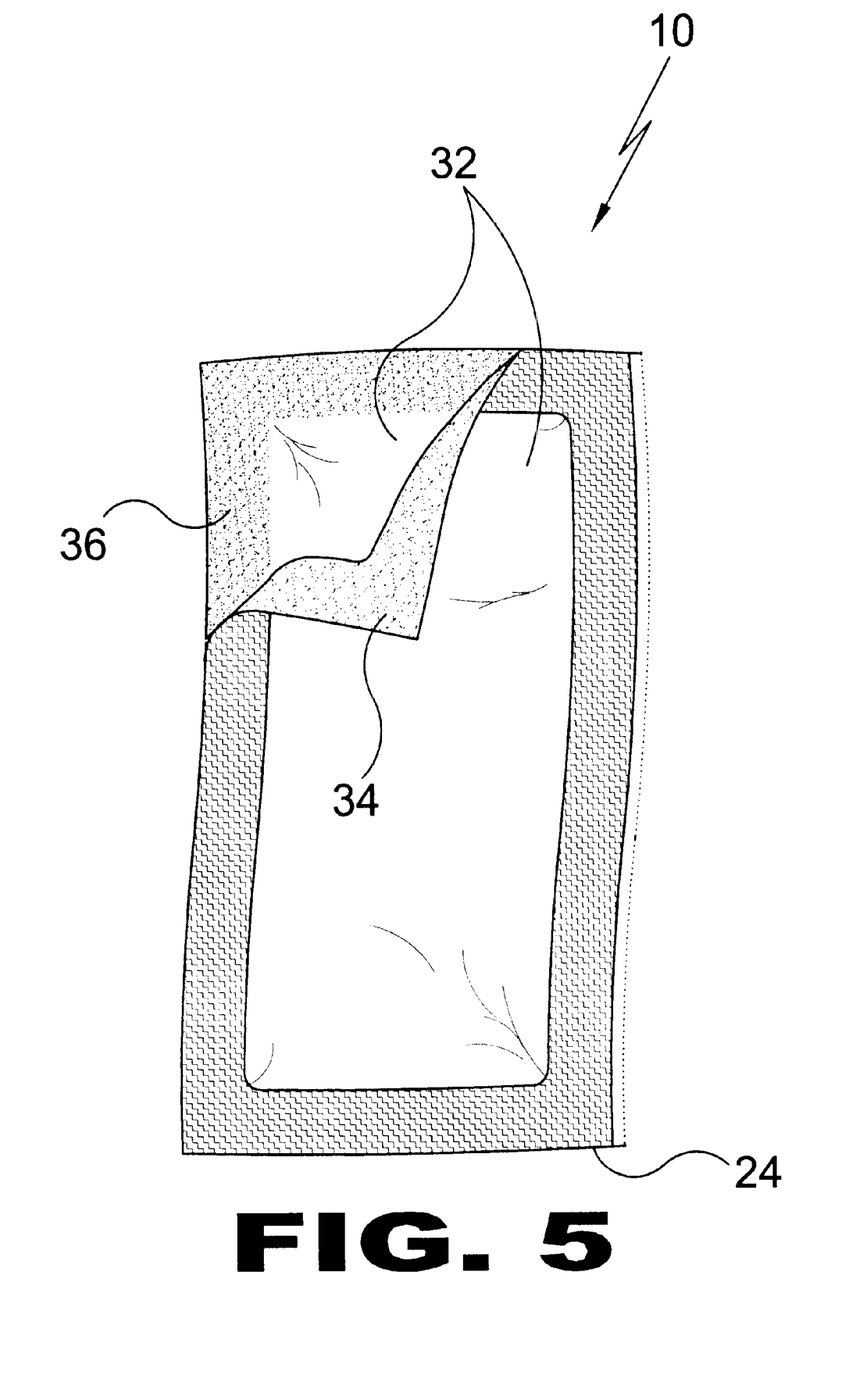
FIG. 5 is a top view of the present invention with the peel and stick backing being removed.

Turning to FIG. 5, shown therein is a top view of the present invention 10 showing the peel-off backing 34 being removed from the patch section 24 to reveal the adhesive 36 around the perimeter of the patch, which is made of plastic 32.

Figure 6:
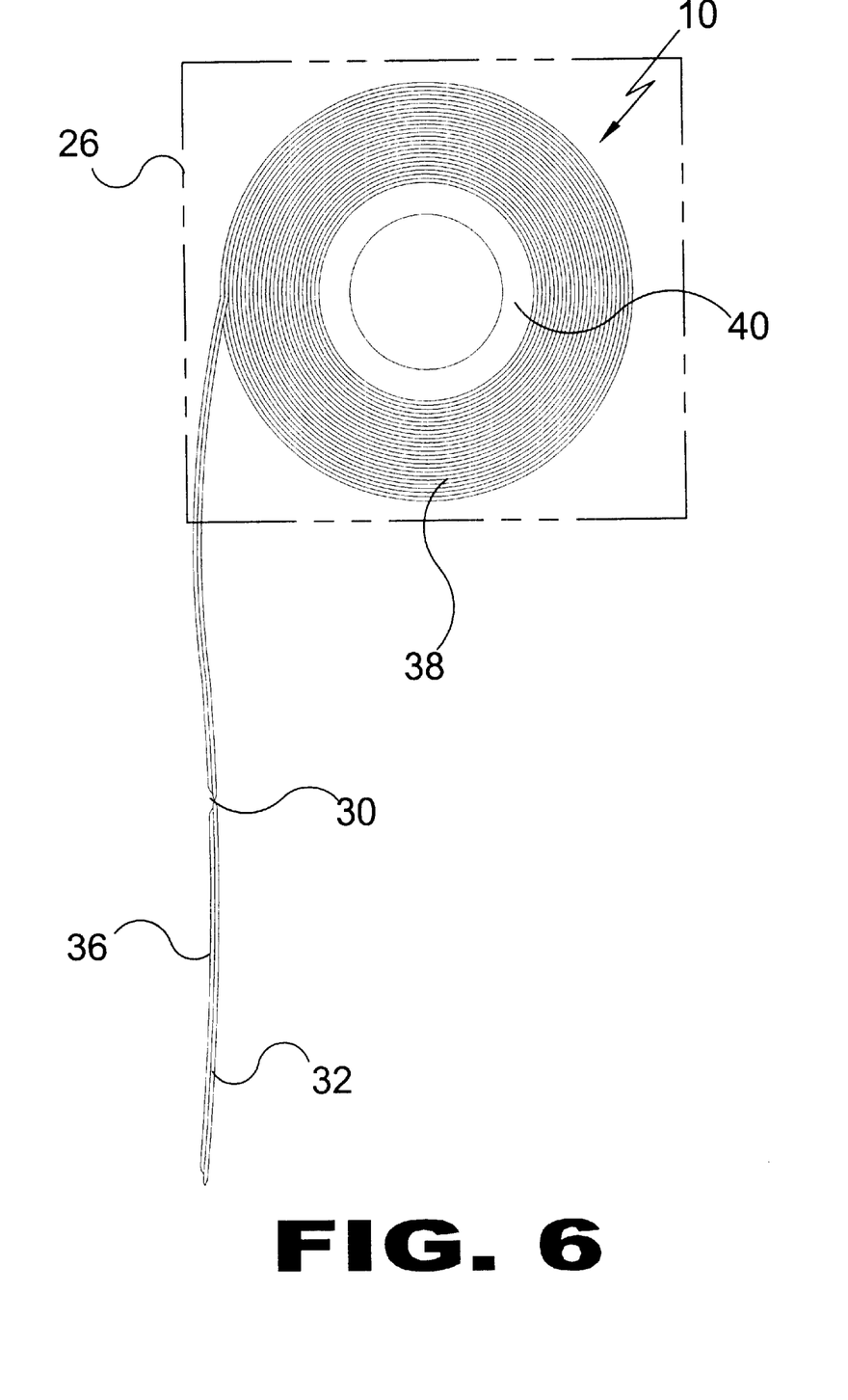
FIG. 6 is a side view of the present invention in the dispenser.

Turning to FIG. 6, shown therein is a side view of the present invention 10 with the dispenser 26 shown in phantom line. A plurality of patch sections in a roll 38 are connected edge to edge and rolled onto a dispensing cylinder 40. Other elements previously disclosed are also shown.

Figure 7:
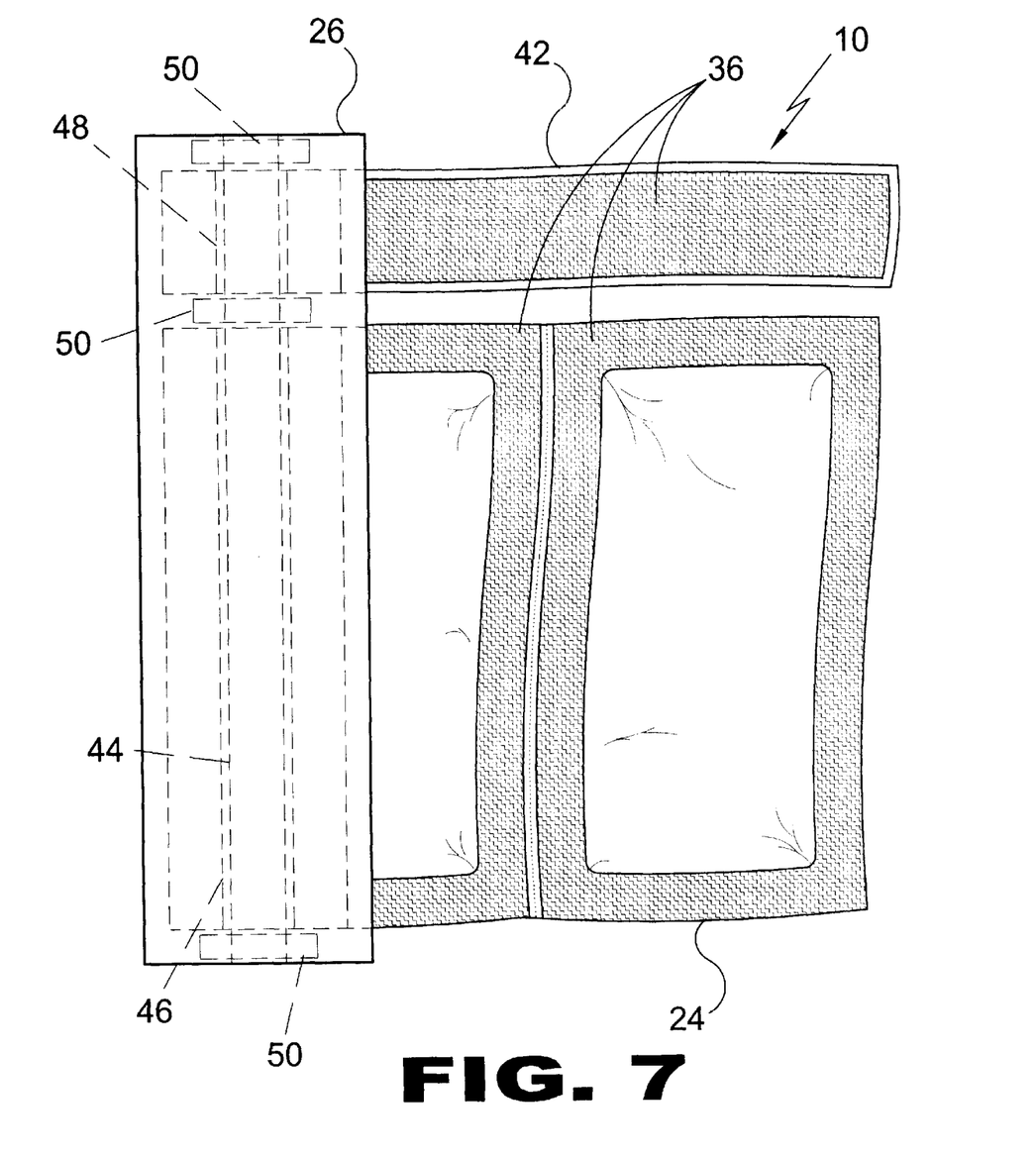
FIG. 7 is a top view of the present invention and reinforcement strip in a dispenser.

Turning to FIG. 7, shown therein is a top view of the present invention 10 showing the dispenser 26 having a roll of surface patches 24 and a roll of elongated reinforcement strips 42 which are much longer than they are wide. A central axle 44 extends longitudinally through the dispenser 26 to allow the two central cylinders 46, 48 to rotate independently. Also shown is the adhesive backing 36 along with multiple spacers 50.

Figure 8:
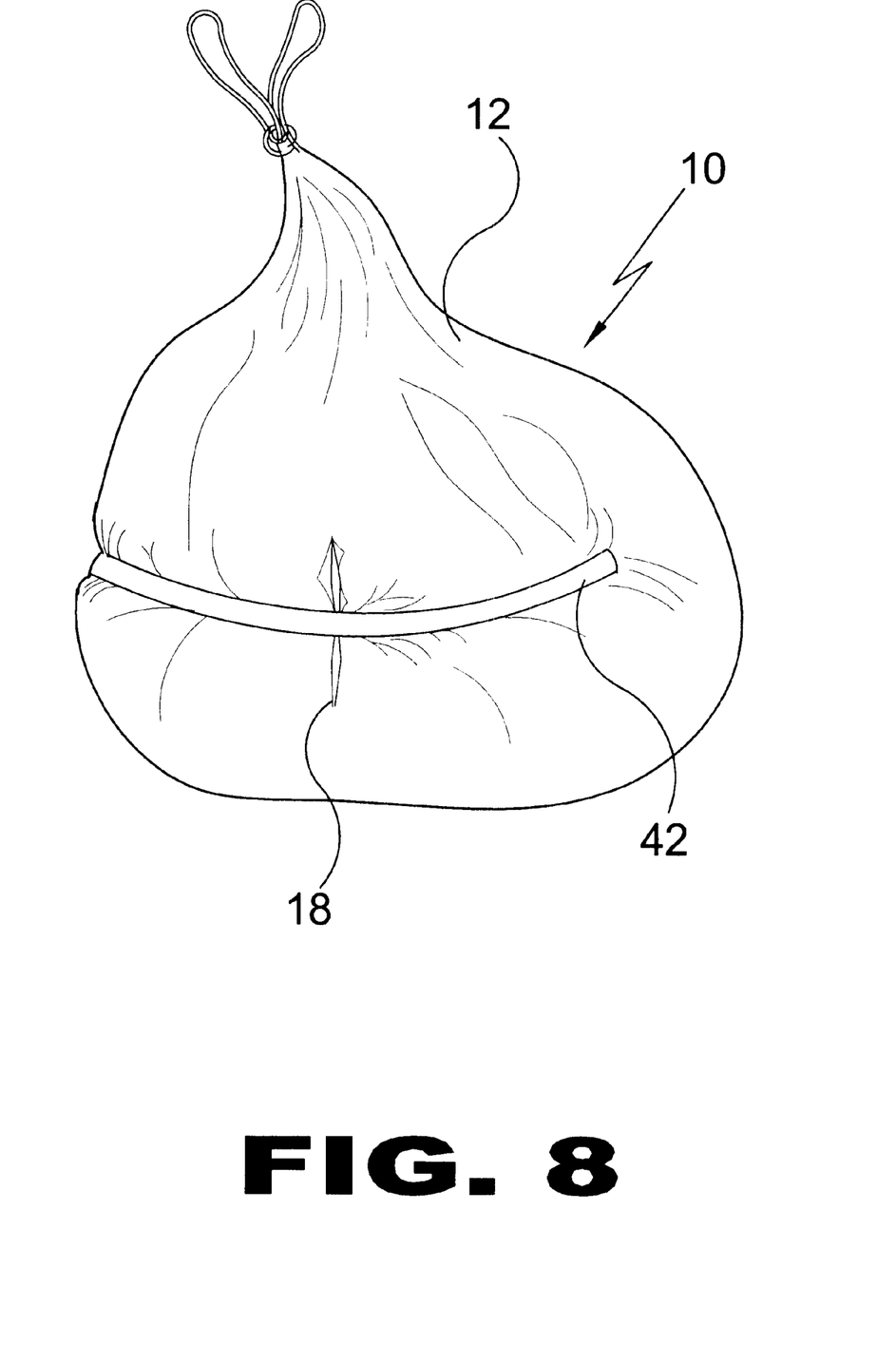
FIG. 8 is a perspective view of a reinforcement strip in use.

Turning to FIG. 8, shown therein is a perspective view of the present invention 10 showing a reinforcement strip 42 on a torn bag 12 to redistribute the internal pressure and prevents the hole or split 18 in the bag from enlarging.

Figure 9:
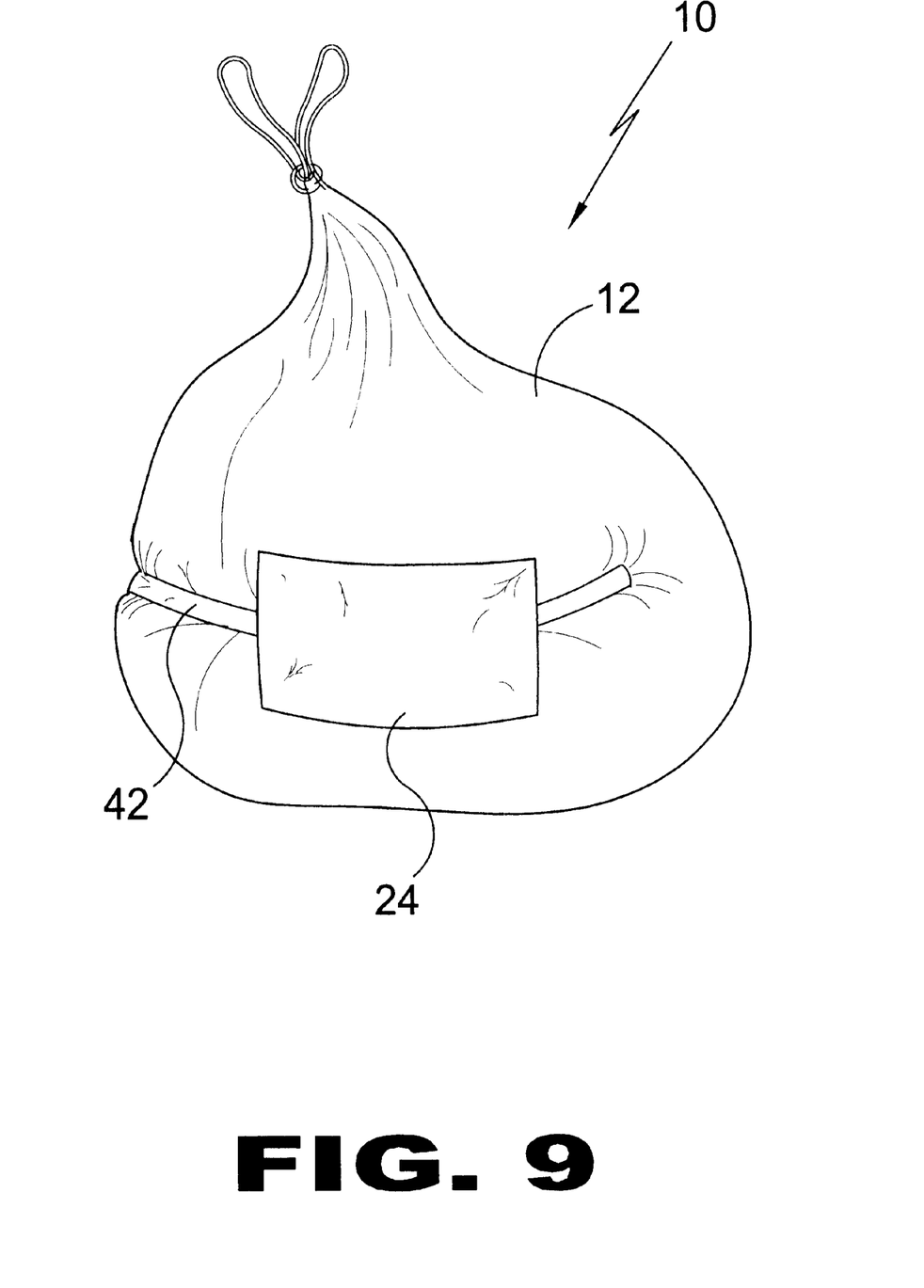
FIG. 9 is a perspective view of a reinforcement strip in use in combination with a surface patch.

Turning to FIG. 9, shown therein is a perspective view of the present invention 10 in use showing a reinforcement strip 42 and surface patch 24 used in combination to relieve the pressure of the contents and completely cover the compromised section of the plastic bag 12.

Figure 10:
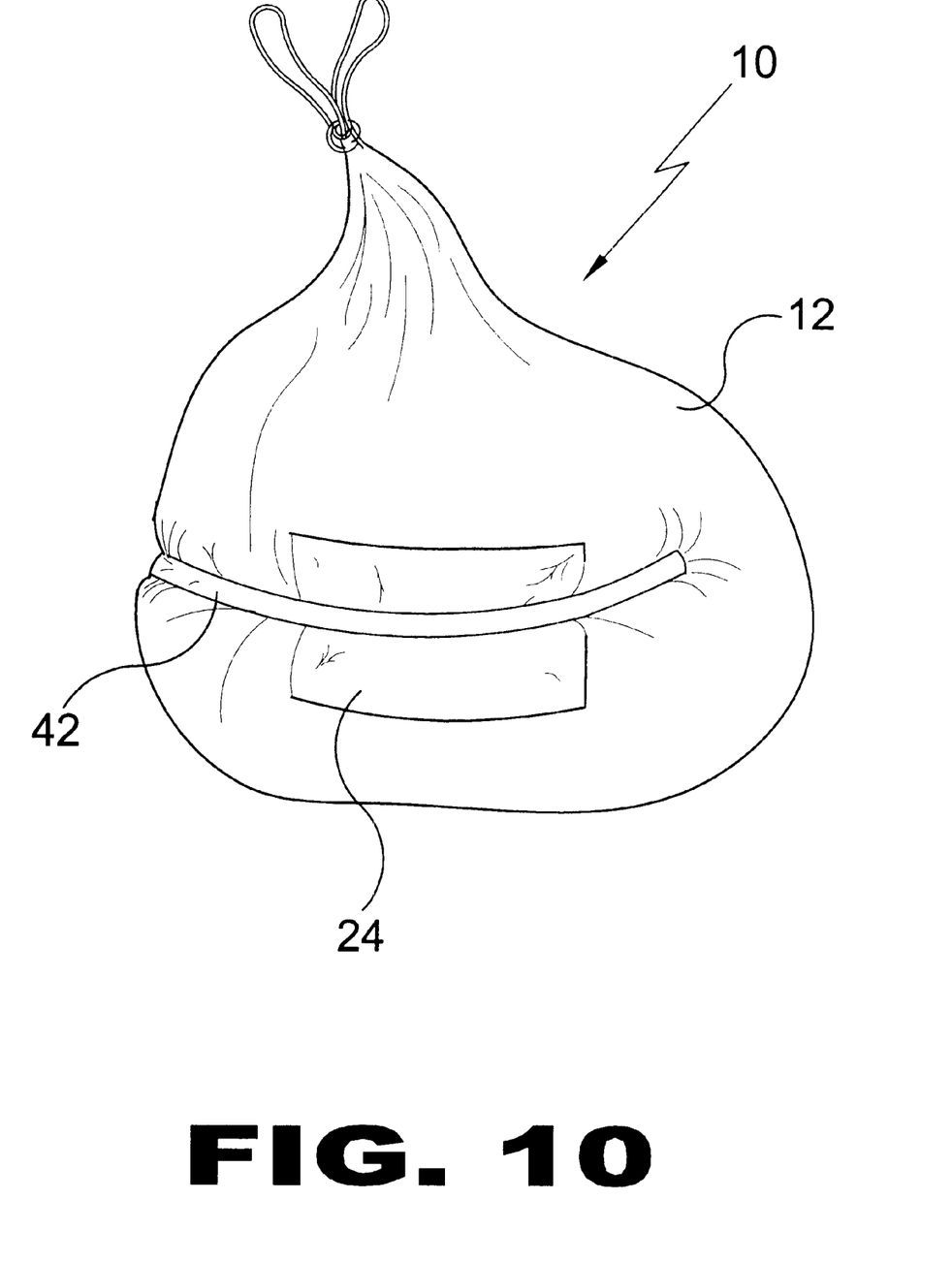
FIG. 10 is a perspective view of a reinforcement strip in use in combination with a surface patch.

Turning to FIG. 10, shown therein is a perspective view of the present invention 10 in use showing a reinforcement strip 42 and surface patch 24 used in combination to relieve the pressure of the contents and completely cover the compromised section of the bag 12.

What is claimed to be new and desired to be protected by Letters Patent is set forth in the appended claims:

1. An apparatus for repairing a hole in a plastic bag, comprising:
   a) a patch of impermeable, plastic material, said patch being a generally planar material, said patch having a first side and a second side, said patch, having at least a pair of opposing edges thereon;
   b) wherein said material is flexible;
   c) an adhesive layer disposed on said first side, said adhesive layer-disposed about the perimeter of said patch;
   d) a peel-off backing layer disposed on top of said adhesive layer so as to keep said adhesive layer fresh prior to use;
   e) means for a perforated edge being disposed on said pair of opposing edges of said patch whereby a pair of said patches are removably joined together by said means for a perforated edge;
   f) an extended length of said patches is formed from a plurality of patches being removably joined together by said perforated edges;
   g) a roll of said patches is formed from a plurality of patches being removably joined together by said perforated edges;
   h) a first cylinder for receiving thereon said roll of patches, said roll of patches being wound upon said first cylinder;
   i) an enclosure for receiving said first cylinder, said roll of patches being thereby dispensed from said enclosure, said roll of patches forming an elongated length of patches, said patches being relatively long compared to the width of said patches, said patches adapted to be used with reinforcement strips; and
   said enclosure having a roll of said reinforcement strips therein and said roll of said patches therein, said enclosure comprising a second cylinder for receiving said roll of reinforcement strips.

2. The apparatus of claim 1, further comprising multiple spacers disposed between said first cylinder and said second cylinder, between said first cylinder and said enclosure, and between said second cylinder and said enclosure.

3. The apparatus of claim 2, wherein said patches are rectangular shaped.

4. The apparatus of claim 3, wherein said rectangular shaped patches are joined on their longer edge by said perforated edge.

* * * * *